(12) United States Patent
Ichihara

(10) Patent No.: US 6,553,018 B1
(45) Date of Patent: Apr. 22, 2003

(54) METHOD AND APPARATUS FOR ADJUSTING TRANSMISSION POWER OF A CDMA TERMINAL

(75) Inventor: Masaki Ichihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/271,103

(22) Filed: Mar. 18, 1999

(30) Foreign Application Priority Data

Mar. 18, 1998 (JP) ............................................ 10-068589

(51) Int. Cl.[7] .............................................. H04B 7/216
(52) U.S. Cl. ........................ 370/342; 370/335; 455/69; 455/127; 455/522
(58) Field of Search ................................. 370/342, 335; 455/69, 522, 127, 572

(56) References Cited

U.S. PATENT DOCUMENTS 5,862,460 A * 1/1999 Rich .......................... 370/342
5,933,781 A * 8/1999 Willenegger et al. ........ 370/342
6,272,125 B1 * 8/2001 Nomura ....................... 370/342

FOREIGN PATENT DOCUMENTS

| EP | 0 822 672 A2 | 2/1998 |
| JP | 9023207 | 1/1997 |
| JP | 9298489 | 11/1997 |
| WO | WO 97/02665 | 1/1997 |

OTHER PUBLICATIONS

European Search Report dated Jan. 2, 2003.

* cited by examiner

Primary Examiner—Lester G. Kincaid
(74) Attorney, Agent, or Firm—Dickstein, Shapiro, Morin & Oshinsky, LLP.

(57) ABSTRACT

Variable gain circuits 16A and 16B are provided, respectively, on an output side of spreading circuits 15A and 15B disposed for each code channel, and after the outputs from the variable gain circuits 16A and 16B are added by adders 17 and 18, orthogonal modulation is applied to the outputs by a modulator 20, and a transmission signal is obtained. Furthermore, a variable gain circuit 22 for adjusting a level of the transmission signal is provided. An adjustment of average transmission power of the code channels is conducted by the variable again circuit 22, and an individual adjustment is conducted by the variable gain circuits 16A and 16B.

40 Claims, 9 Drawing Sheets

METHOD AND APPARATUS FOR ADJUSTING TRANSMISSION POWER OF A CDMA TERMINAL

BACKGROUND OF THE INVENTION

The present invention relates to a communication terminal apparatus by means of CDMA (Code Division Multiple Access) utilizing spread spectrum system, and especially to a method of and an apparatus for controlling transmission power in one communication terminal apparatus in case of conducting multi-code transmission in which a plurality of spreading code channels are allocated to the communication terminal apparatus, and thereby, transmission capacity is enlarged.

In a mobile communication system having a base station and a plurality of mobile communication terminals, as a connection method in which the number of terminals capable of being accommodated in the system is increased, and which is capable of flexibly corresponding to a change of a transmission speed, CDMA in which a spread spectrum system is applied has been watched.

In case of mobile communication by means of the CDMA, especially in case of using Direct Sequence (DS) as a method of spread spectrum, if transmission power from the mobile communication terminals is the same as each other, since a reception electric field at the base station is generally in inverse proportion to a square of a distance between the base station and the mobile communication terminals, a weak radio wave from the terminal far from the base station is strongly interfered with a strong radio wave from the terminal near the base station, and a radio wave from the remote terminal cannot be normally received at the base station. Accordingly, it is necessary to control the transmission power for each terminal so that strength of received radio waves from each terminal is almost the same as each other at a position of the base station.

Conventionally, in the mobile communication system by means of the CDMA, it is usual that one code channel is allocated to one terminal that is used by a user. Here, the code channel is a communication channel that is specified by a spreading code (pseudorandom noise code) being used for spreading.

FIG. 7 is a block diagram simply showing a conventional mobile terminal 101 in accordance with a CDMA method from an aspect of transmission power control, and here, it is assumed that data transmission is conducted from the mobile terminal 101 to a base station 102 using only one code channel. The data to be transmitted is supplied to the mobile terminal 101 from a signal source 104 connected to the mobile terminal 101.

The data to be transmitted is often a voice signal, and is sometimes a high speed multi-media data that is output from a computer. In any event, it is assumed that the signal source 104 is for outputting a data stream at a bit rate of R bits/second.

Provided in the mobile terminal 101 are a receiver 112 connected to a reception antenna 111, a transmitter 114 connected to a transmission antenna 113, a spreading circuit 115 to which a data stream from the signal source 104 is input, a D/A (Digital/Analog) converter 116 for converting a digital signal output from the spreading circuit 115 into an analog signal, a modulator 117 for applying orthogonal modulation to a carrier wave based on an output from the D/A converter 116, a variable gain circuit 118 inserted between an output of the modulator 117 and an input of the transmitter 114. An oscillation circuit 119 for generating a high frequency signal that is a carrier signal is connected to the modulator 117.

After applying error correction coding and a process such as interleave and encrypt to a data stream from the signal source 104, the spreading circuit 115 spreads using a spreading code corresponding to an allocated code channel, and outputs a base band signal. Here, the spreading circuit 115 is constructed as a digital signal processing circuit, and spreads the data stream from the signal source 104 to generate a signal and outputs a multilevel digital signal as a base band signal, which represents an instant value of this signal every moment. Also, in the modulator 117, orthogonal modulation is conducted by means of four phases PSK (phase shift modulation) (QPSK (Quadrature Phase Shift Keying)), and accordingly, an in-phase component I and an orthogonal component Q of the base band signal are output from the spreading circuit 115 as a multilevel digital signal, respectively, and the D/A converter 116 independently converts the in-phase component I and the orthogonal component Q into analog signals, respectively, and the modulator 117 receives these in-phase component I and orthogonal component Q and conducts modulation.

Here, an arrangement of the spreading circuit 115 will be explained using FIG. 8. This spreading circuit 115 is for applying direct sequence (DS) system as spread spectrum system to the input data stream. In FIG. 8, values in parentheses show typical examples of a data speed, a chip rate and so forth.

A data stream of a data speed 128 kbps (bps is the number of bits per second) for example is input from the signal source, and a serial/parallel conversion circuit 121 with one input and two outputs (1→2) is provided for dividing this input data stream into two series of data streams with a data speed (64 kbps in this example) that is a half compared with the input data stream. One data stream from the serial/parallel conversion circuit 121 corresponds to the in-phase component I in the orthogonal modulation, and the other data stream corresponds to the orthogonal component Q. Disposed are a PN code generator 122 for generating a pseudorandom noise code (PN code) as a spreading code for the in-phase component I, and a PN code generator 123 for generating a pseudorandom noise code (PN code) as a spreading code for the in-phase component Q. The data stream and spreading code on a side of the in-phase component I are input to an adder 124, and thereby, the data stream corresponding to the in-phase component I is spreaded. In the same manner, the data stream and spreading code on a side of the orthogonal component Q are input to an adder 125, and thereby, the data stream corresponding to the orthogonal component Q is spreaded. The adders 124 and 125 are for calculating exclusive OR between the input data stream and the spreading code. A chip rate of a signal after spreading which is output from each of the adders 124 and 125 is 4.096 Mcps (cps is the number of chips per second), for example. The signals after spreading from the adders 124 and 125 are input to FIR (finite impulse response) filters 126 and 127 that function as a low pass filter, respectively, and thereby, a multilevel digital signal (8 bits value signal, for example) is output every moment, which represents an instant value of a base band signal of the in-phase component I and the orthogonal component Q.

In this manner, spread spectrum is applied to the data stream, and a transmission signal with a predetermined frequency band can be obtained from an output of the modulator 117. A level adjustment for this transmission signal is conducted by the variable gain circuit 118, and thereafter, this transmission signal is transmitted from the transmitter 114. The variable gain circuit 118 is constructed of an amplifier capable of varying a gain or an attenuator capable of varying an amount of attenuation. As mentioned below, a gain (or an amount of attenuation) in the variable gain circuit 118 is controlled by a TPC (Total Power Control) signal from the receiver 112 1 dB by 1 dB, for example.

Now, it is assumed that a bit rate of the data stream from the signal source 104 is R [bits/second], and a band width of the transmitted signal is W [Hz], $$G=W/R \qquad (1)$$

is called a spreading gain.

After receiving such a transmission signal from the mobile terminal 101, the base station 102 applies de-spreading, decoding, de-interleave and error correction to this signal. It is assumed that signal power per bit necessary for fully receiving this signal in the base station 102 is $E_b$, noise power per Hertz is $N_0$, and a ratio of these is $E_b/N_0$. Here, to fully receive the signal means that a bit error rate in a data stream output after the error correction is satisfied with a predetermined level. Then, a carrier/noise ratio (C/N) that is needed in the base station 102 is:

$$C/N = (R \cdot E_b)/(W \cdot N_0) \qquad (2)$$
$$= (1/G) \cdot (E_b/N_0)$$

From this, a signal level that is needed in the base station 102 is represented as follows:

$$C=N \cdot (1/G) \cdot (E_b/N_0) \qquad (3)$$

Then, the base station 102 transmits to each mobile terminal 101 a command for controlling transmission power so as to always make a reception level of the signal to be C. Particularly, in case that a signal level of a code channel received from a certain mobile terminal 101 is smaller than the value C, the base station 102 transmits a command for making transmission power of the mobile terminal 101 increase by a constant (1 dB, for example), and in case that the signal level is larger conversely, the base station 102 transmits a command for making the transmission power decrease to the mobile terminal. This command is called a TPC (Total Power Control) signal. This signal can be a command that makes the transmission power increase if its value is "1" for example, and that makes the transmission power decrease if its value is "0."

The mobile terminal 101 receives the TPC signal at the receiver 112. The received TPC signal is output from the receiver 112 to the variable gain circuit 118, and the variable gain circuit 118 increases or decreases a gain by a constant (1 dB, for example) in accordance with the TCP signal. Thereby, the transmission signal level is adjusted to a level required by the base station 102. A method of controlling the transmission power of the mobile terminal in this manner is called closed loop control. This control method is generally used in an IS-95CDMA system and so forth, which is a mobile communication system in the United States.

By the way, in recent years, even in a mobile communication field, multimedia of a transmission data has been developed, and only low speed data communication using only voice is unsatisfying and a higher speed transmission method is needed, such as connection to an internet and image communication. As one method for meeting these needs, multi-code transmission is being watched.

Different from conventional transmission, the multi-code transmission is for increasing a transmission speed by allocating a plurality of code channels (two channels, for example) to one terminal. If the number of codes is N (where $n \geq 2$), in case that a bit rate per code is $R_0$, a collective transmission rate $R_T$ is as follows:

$$R_T = N \cdot R_0 \qquad (4)$$

Namely, compared with a case in which a single code channel is used, it is possible to make the transmission rate to be N times.

However, in case of conducting the multi-code transmission, it is required to finely control the transmission power every code channel due to a reason as mentioned below. The present invention deals with how to control the transmission signal power of the terminal in case of conducting the multi-code transmission.

As main application of the multi-code transmission, a case can be raised, in which a voice signal and a data signal are concurrently transmitted. Particularly, there is a case in which by using two code channels, one of the code channels is allocated to transmission of a voice signal such as a conversation and the other is allocated to transmission of a data signal for a file exchange between computers. In considering such a situation, allowable error rates are different from each other between the voice signal and the data signal, and while a bit error rate of about $10^{-3}$ is allowed for the voice signal, a bit error rate equal or less than $10^{-6}$ is sometimes necessary for the data signal. On the other hand, in order to improve a capacity of an entire mobile communication system in case of using spread spectrum system, it is important to reduce transmission power as a whole. Furthermore, it is considered that in a certain area of the mobile communication system, in a moment, while there are many mobile terminals that is conducting voice communication, there are not many mobile terminals that is conducting data communication so much. If considering the above, in the mobile terminal for conducting the multi-code transmission, without controlling the transmission power of code channels of both the voice signal and data signal so as to make both the transmission power of the code channels to be the same as each other based on a bit error rate required for the data signal, it becomes to be possible to make a capacity of the entire mobile communication system increase while meeting bit error rate required for the respective signals by making the transmission power of the code channel of the voice signal relatively small and making the transmission power of the code channel of the data communication relatively large, and also, it becomes to be possible to extend a time during which conversation by telephone can be made in accordance with a battery capacity of the mobile terminal.

As above, by raising the case, as an example, in which the voice signal and the data signal are allocated to the respective code channels, the reason why the transmission power control should be conducted for each code channel in case of conducting the multi-code transmission was explained. However, a kind of the signal to be transmitted is not necessarily limited to the voice signal such as conversation and the data signal for the file exchange. For example, there is also a case in which a dynamic image data, a static image data and so forth are transmitted. Also, even in the voice signal, there are a case such as conversation in which relatively low voice quality is allowed, and also, a case such as music in which relatively high quality is required. Even in data communication between computers, bit error rates required for a layer of the transmission by means of the CDMA are different from each other in accordance with an upward protocol. Therefore, it is required to determine a bit error rate and so forth in accordance with a kind and characteristic of a signal (data) to be transmitted, and to precisely conduct transmission power control in accordance with the determined ratio.

It can be also considered that a transfer route of a data to be transmitted is changed for each code channel. In considering that a band width of a signal after spreading is determined by a chip rate, since, if chip rates are the same, a spreading gain is improved as a data rate becomes to be lower, it is possible to make transmission power small by the improvement. From this point also, it is required to precisely conduct transmission power control for each code channel.

Now, out of the methods of conducting the transmission power control for each code channel in this manner, a method can most easily be imagined, in which a plurality of circuits from the signal source 104 to variable gain circuit 118 in the circuit shown in FIG. 7 are prepared in accordance with the number of code channels to be used, and outputs from the plurality of variable gain circuits are added to each other in an analog manner by a high frequency signal adder (wave coupler), and a signal after the addition is input to the transmitter. FIG. 9 is a block diagram showing an arrangement of a mobile terminal for controlling transmission power by means of the method mentioned here, in which N is equal to two, that is, the number of the code channels to be used in the terminal is two. In this mobile terminal 121, two series of circuits from the signal source 104 to the variable gain circuit 118 in the mobile terminal 101 shown in FIG. 7 are simply mounted. In FIG. 9, by adding one of letters A and B to a symbol, it is clearly shown that each component belongs to which series. In other words, a circuit corresponding to a code channel A is a circuit from the signal source 104A to the variable gain circuit 118A, and a circuit corresponding to a code channel B is a circuit from the signal source 104B to the variable gain circuit 118B. In addition, spread codes used in the spreading circuits 115A and 115B are spread codes of the code channels A and B, respectively, and therefore, the spreading circuits 115A and 115B use spread codes different from each other. Also, the oscillation circuit 119 for generating a carrier signal is provided for the modulators 117A and 117B in common. The outputs from both the variable gain circuits 118A and 118B are added to each other in an analog manner by the signal adder (wave coupler) 122, and an output from the signal adder 122 is input to the transmitter 114. As a result, a signal generated by adding the transmission signals of the code channels A and B to each other is transmitted to the base station 102.

The base station 102 considers the code channels A and B as individual channels, respectively, and transmits a TPCA signal and a TPCB signal to the mobile terminal 121, which are TPC signals for each code channel. The mobile terminal 121 receives a signal from the base station 101, and controls the variable gain circuits 118A and 118B, respectively, using the received TPCA signal and TPCB signal. Thereby, closed loop power control for each code channel is conducted.

However, in case that the control of the transmission power for each code channel is conducted using the circuit shown in FIG. 9 in conducting the multi-code transmission, there is a task that this circuit is simply constructed by mounting a plurality of circuits from the signal source to the variable gain circuit just before the transmitter, which corresponds to the number of the multi-code, and that a circuit scale thereof is not different so much from that in the case of using individual mobile terminals for each code channel. Especially, since high frequency circuits such as modulators and D/A converters are provided in accordance with the number of the code channels, electric power consumption becomes to be larger than that in a usual terminal. Especially, to provide a plurality of D/A converters directly results in the increase of electric power consumption. Ultimately, in the arrangement shown in FIG. 9, the sense that the terminal appropriate for the multi-code transmission is arranged cannot be accomplished. Furthermore, since there are a plurality of code channels in the case of the multi-code transmission, the control of the transmission power is complicated, and in the arrangement shown in FIG. 9, there is also a task that this control is not rationalized.

SUMMARY OF THE INVENTION

The objective of the present invention is to provide a transmission power control method and apparatus for conducting transmission power control during multi-code transmission, which can reduce a circuit scale and electric power consumption more and is capable of conducting optimum power control.

The objective of the present invention is to provide a method of adjusting transmission power in a CDMA terminal for code division multiple access communication with spread spectrum system and transmitting information using a plurality of code channels, said method comprising steps of: generating base band signals by spreading data every code channel; adjusting levels of said base band signals every code channel; adding said adjusted base band signals over said plurality of code channels; modulating based on a signal after addition to generate a high frequency signal; adjusting a level of said high frequency signal; and sending said adjusted high frequency signal to the other station.

In the transmission power adjusting method of the present invention, it is preferable that an adjustment in quantity of levels of the base band signals every code channel and an adjustment in quantity of a level of the high frequency signal are determined based on a control signal from the other station such as a base station. In this case, levels of the base band signals cannot be changed and only a level of the high frequency signal can be changed when the control signal is for increasing or decreasing the levels by a constant in quantity common to each code channel, and also, a total average level of transmission signals of the code channels can be adjusted by the step of adjusting a level of the high frequency signal, and a difference of levels between the code channels can be adjusted by the step of adjusting levels of the base band signals every code channel.(Total average level means commonly changing portion of transmit signal level).

The objective of the present invention is to provide an apparatus for adjusting transmission power in a CDMA terminal for code division multiple access communication with spread spectrum system and transmitting information using a plurality of code channels, comprising: a plurality of spreading means disposed for each code channel, said spreading means for spreading data; a plurality of first variable gain control means disposed for said each code channel, said first variable gain control means for adjusting levels of output signals from said spreading means; adder for adding outputs from each of said first variable gain control means; modulator for modulating based on an output from said adder, and outputting a high frequency signal; and second variable gain control means for adjusting a level of said high frequency signal.

In the transmission power adjusting apparatus for the CDMA terminal of the present invention, it is especially preferable that a transmitter for sending an output signal from the second variable gain control circuit to the other station such as a base station is provided. Also, it is preferable that each of the spreading circuits and each of the first variable gain control means are disposed in a digital signal processing circuit section, and that the second variable gain control means is constructed as a high frequency analog circuit.

In the transmission power adjusting apparatus of the present invention, it is general that the transmission power is adjusted based on a control signal from the other station such as a base station. For that, control means can be provided for determining a level adjustment in quantity in each of the first variable gain control means and the second variable gain control means based on a control signal from the other station, for example. As the control means, a level control calculating circuit is used, for example, which will be mentioned below in an embodiment. In this case, a total average level of transmission signals of the code channels can be adjusted by the second variable gain control means, and a difference of levels between the code channels can be adjusted by the first variable gain control means.

Furthermore, a difference of levels between the code channels is previously set, and only a level adjustment in quantity of the second variable gain control means can be controlled in accordance with a level control signal from the other station. In this case, a level setting circuit can be provided for setting a level adjustment in quantity in each of the first variable gain control means based on a required level difference between the code channels. Also, the level difference between the code channels can be determined using information with respect to characteristic of a transmission data in the each code channel.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
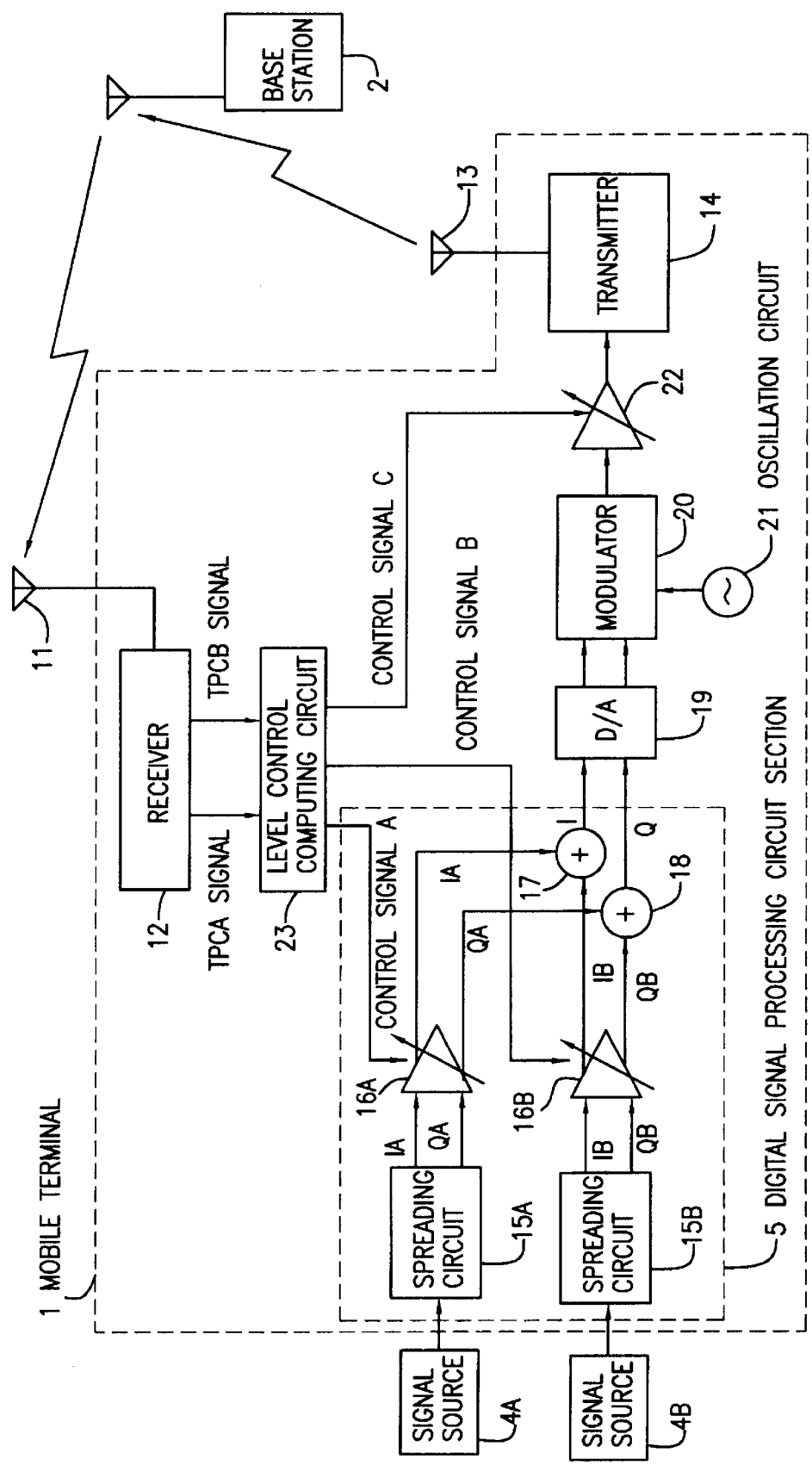
FIG. 1 is a block diagram showing an arrangement of a mobile terminal of the first embodiment of the present invention.

Next, preferable embodiments of the present invention will be explained by referring to the drawings.

The first embodiment

FIG. 1 is a block diagram showing an arrangement of a mobile terminal of the first embodiment including a transmission power control apparatus of the present invention. Here, the case will be explained, in which the number of code channels of a multi-code is two. Here, the two code channels are distinguished from each other by adding letters A and B.

Signal resources 4A and 4B are for generating data streams of code channels A and B, respectively, are connected to a mobile terminal 1. Also, the mobile terminal 1 includes a receiver 12 connected to a transmission antenna 13, spreading circuits 15A and 15B for receiving data streams from the signal sources 4A and 4B, respectively, and variable gain circuits 16A and 16B disposed on the output sides of the spreading circuits 15A and 15B, respectively.

Figure 8:
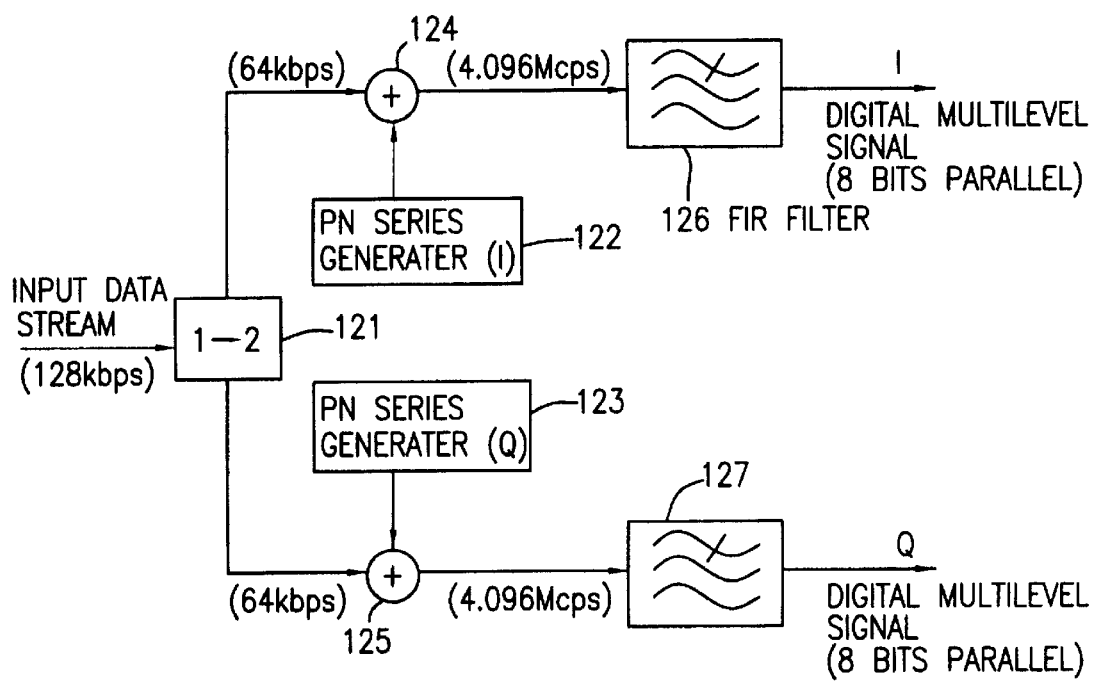
FIG. 8 is a block diagram showing a general arrangement of a spreading circuit.

After applying error correction coding and a process such as interleave and encrypt to data streams from the signal sources 4A and 4B, the spreading circuits 15A and 15B spread using a spreading code corresponding to an allocated code channel, and output base band signals. The spreading circuit 15A uses the spreading code for the code channel A, and the spreading circuit 15B uses the spreading code for the code channel B. Here, since a transmission signal modulated by QPSK is transmitted to a base station 2 from the mobile terminal 1, the spreading circuit 15A of the code channel A outputs an in-phase component IA and an orthogonal component QA of the base band signal, and similarly, the spreading circuit 15B of the code channel B outputs an in-phase component IB and an orthogonal component QB of the base band signal. Also, an internal circuit arrangement of the spreading circuits 15A and 15B is the same as the internal arrangement of the spreading circuit explained by using FIG. 8.

The variable gain circuit 16A adjusts levels of the in-phase component IA and the orthogonal component QA of the base band signal of the code channel A, and the variable gain circuit 16B adjusts levels of the in-phase component IB and the orthogonal component QA of the base band signal of the code channel B.

Furthermore, an adder 17 for conducting vector addition of the in-phase components IA and IB of the base band signal of each code channel and outputting a result as a combined in-phase component I, and an adder 18 for conducting vector addition of the orthogonal components QA and QB and outputting a result as a combined orthogonal component Q are provided on output sides of the variable gain circuits 16A and 16B. In other words, the followings are established with respect to the in-phase component I and the orthogonal component Q output from the adders 17 and 18, respectively:

$$I=IA+IB \tag{5}$$

$$Q=QA+QB \tag{6}$$

In the mobile terminal 1 of this embodiment, the spreading circuits 15A and 15B, the variable gain circuits 16A and 16B, and the adders 17 and 18 constitute a digital signal processing circuit section 5 for conducting digital signal processing. The spreading circuits 15A and 15B generate signals by spreading the data streams from the signal sources 4A and 4B with spreading codes, and output multilevel digital signals representing an instant value of the generated signals every moment as base band signals. The variable gain circuits 16A and 16B can be constructed of coefficient multipliers (multipliers), for example, and adjust levels by multiplying the multilevel digital signals that are outputs from the spreading circuits 15A and 15B by a value corresponding to a level adjustment value, and also, output a result thereof as digital values. The adders 17 and 18 output as digital values the in-phase component I and the orthogonal component Q combined every moment, respectively, by digital calculation.

A D/A (Digital/Analog) converter 19 for converting a signal of a digital value into an analog signal is provided on an output side of the adders 17 and 18. The D/A converter 19 converts the in-phase component I and the orthogonal component Q of the base band signals that are digital signals, respectively, and outputs an in-phase component I and an orthogonal component Q of analog signals, and the in-phase component I and the orthogonal component Q of these analog signals are input to a modulator 20. An oscillation circuit 21 for generating a high frequency signal that is a carrier signal is connected to the modulator 20, and the modulator 20 applies orthogonal modulation to the carrier signal by means of QPSK based on the in-phase component I and the orthogonal component Q of the base band signals from the D/A converter 19, and outputs a transmission signal. This transmission signal is input to the transmitter 14 through a variable gain circuit 22, and thereby, the transmission signal is transmitted to a side of the base station 2. Here, the variable gain circuit 22 is for conducting a level adjustment of the transmission signal, and is constructed of an amplifier capable of varying a gain or an attenuator capable of varying an amount of attenuation.

Furthermore, in this mobile terminal 1, a level control calculating circuit 23 is provided for controlling a level adjustment value at the variable gain circuits 16A, 16B and 22. A TPCA signal and a TPCB signal that are TPC signals for each code channel are input to the level control calculating circuit 23 from the receiver 12, and the level control calculating circuit 23 outputs control signals A, B and C for a level adjustment to the variable gain circuits 16A, 16B and 22, respectively, based on these TPCA signal and TPCB signal.

Figure 9:
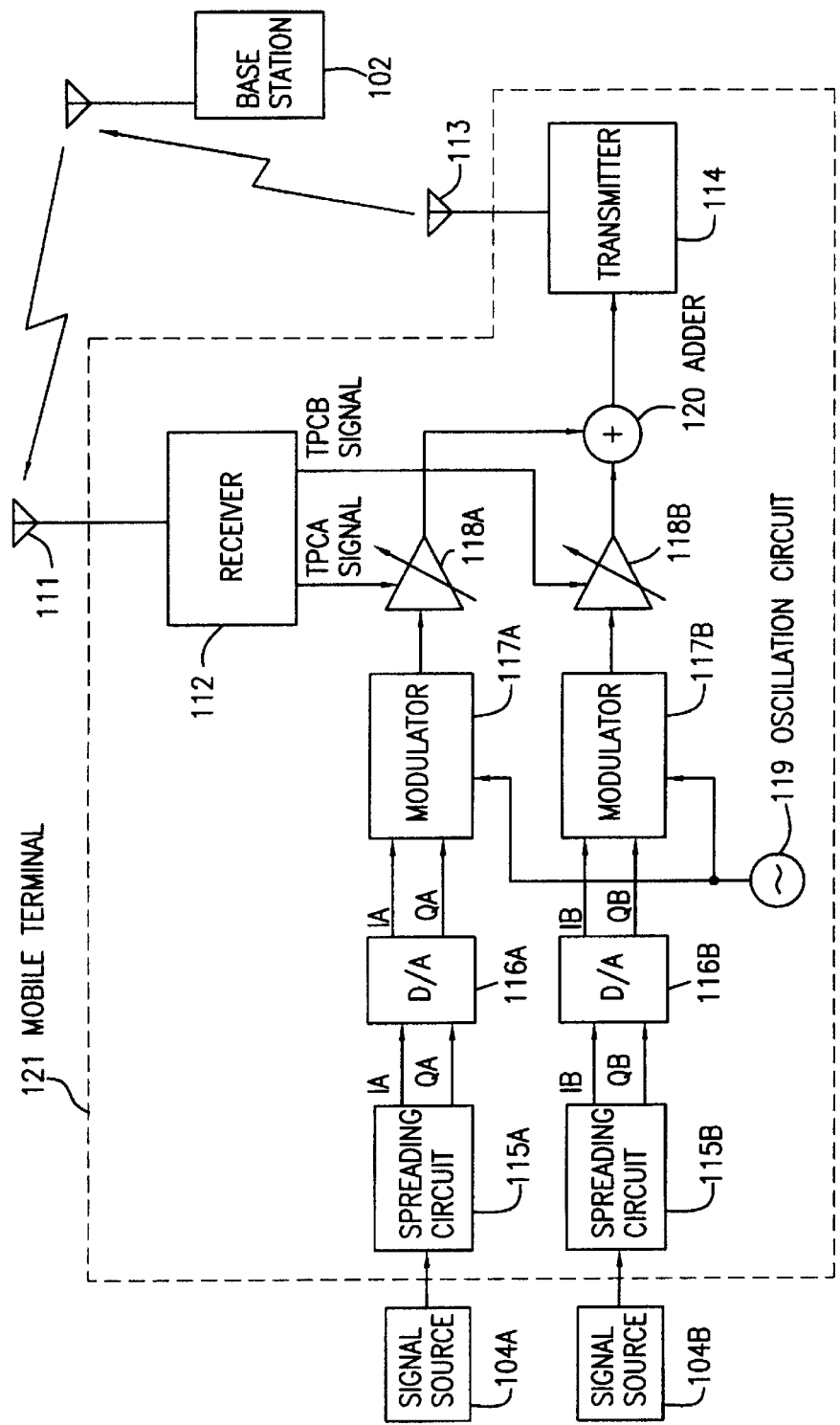
FIG. 9 is a block diagram showing an arrangement that is considered in case of conducting control of transmission power for each code channel in a mobile terminal in which the number of code channels is two.

Ultimately, there are differences of the mobile terminal 1 shown in FIG. 1 from the mobile terminal 121 shown in FIG. 9 in the points that the mobile terminal 1 is constructed so as to conduct QPSK modulation after combining base band signals of both the code channels, and the variable gain circuits 16A and 16B for each code channel are provided in the digital signal processing circuit section 5 and the variable gain circuit 22 for acting upon both the code channels in common is included in the high frequency analog circuit, and the level control calculating circuit 23 is provided for properly operating the variable gain circuits 16A, 16B and 22. In other words, in this mobile terminal 1, three gain control circuits exist in all.

Next, operation of this mobile terminal 1 will be explained.

The data streams of each code channel are input to the spreading circuits 15A and 15B from the signal sources 4A and 4B, and after spreading is applied, are converted into base band signals of an in-phase component and an orthogonal component. After a level adjustment with respect to these base band signals is conducted for every code channel by the variable gain circuits 16A and 16B, in-phase components are added to each other by the adder 17 and orthogonal components are added to each other by the adder 18, and an in-phase component I and an orthogonal component Q after combination can be obtained. Signals of these in-phase component I and orthogonal component Q are converted into analog signals, respectively, by the D/A converter 19, and thereafter, are input to the modulator 20. Thereby, a four phases PSK modulated high frequency signal is obtained as a transmission signal, and this transmission signal is transmitted to the base station 2 through the variable gain circuit 22 and the transmitter 14.

The base station 2 receives a signal of each code channel from the mobile terminal 1, determines whether a reception level is a proper level for every code channel, and transmits to the mobile terminal 1 a TPCA signal and a TPCB signal that are power control signals for each code channel, in accordance with a determination result. In the mobile terminal 1, the receiver 12 receives these TPCA signal and TPCB signal, and the received TPCA signal and TPCB signal are sent to the level control calculating circuit 23. The level control calculating circuit 23 controls the variable gain circuits 16A, 16B and 22A based on the TPCA signal and the TPCB signal.

Here, the control of the variable gain circuits 16A, 16B and 22 based on the TPCA signal and the TPCB signal will be explained in detail. Hereupon, it is assumed that the power control signals (the TPCA signal and the TPCB signal) of each code channel are for instructing one of the increase or decrease of transmission power of the code channel, and are periodically transmitted from the base station 2 (while being included in a pilot signal part of each transmission slot, for example).

Figure 2:
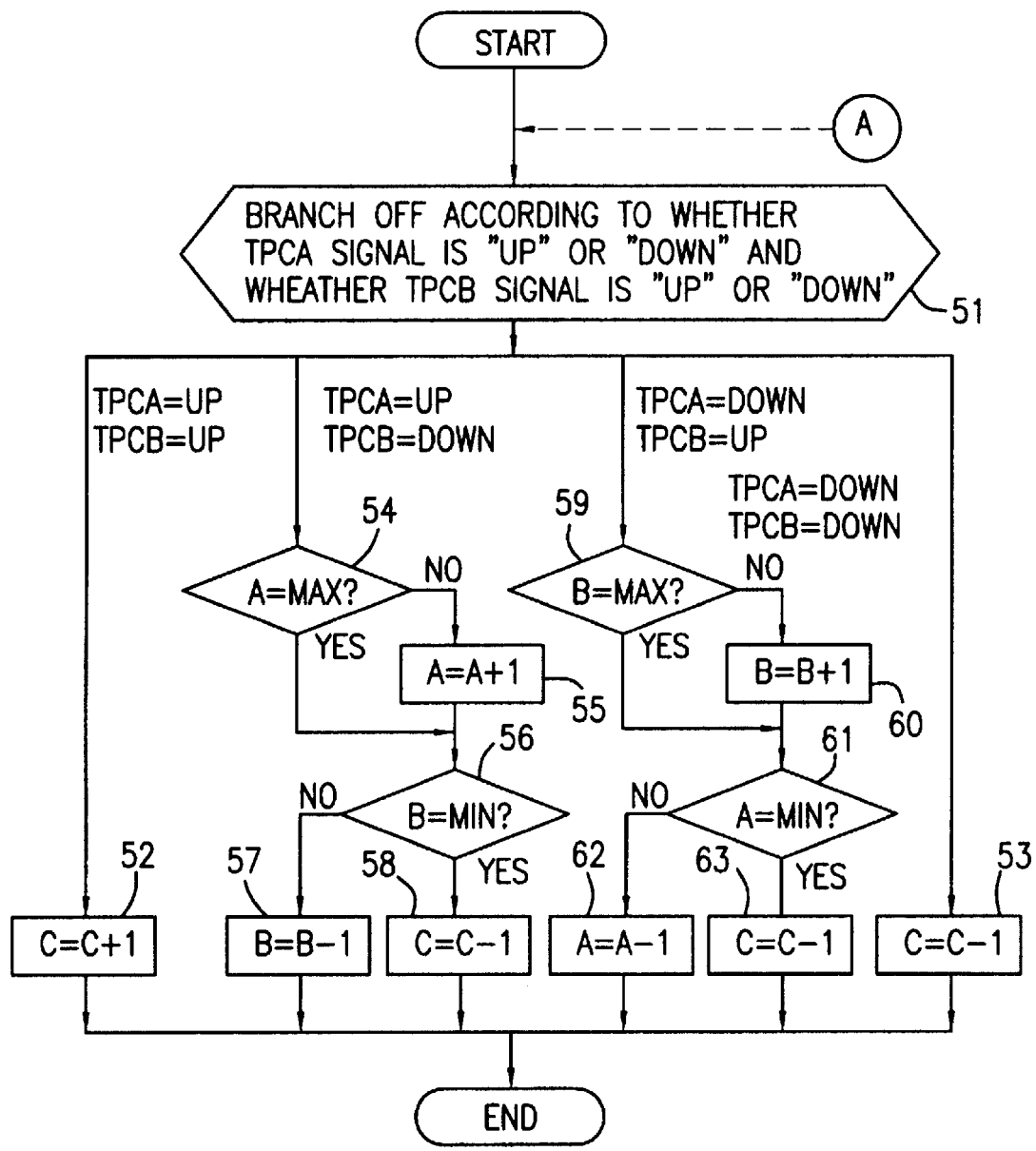
FIG. 2 is a flowchart showing one example of processing procedure of transmission power control.

Since, in the variable gain circuit 22 within the high frequency analog circuit section, out of the three variable gain circuits, a wide dynamic range that exceeds 80 dB can be obtained, it is preferable to control a total average and large common variation of the two code channels by this variable gain circuit 22. On the contrary, since the individual variable gain circuits 16A and 16B for the code channels are arranged inside of the digital signal processing circuit 5, respectively, and since a dynamic range of at most about 20 dB can be obtained due to the restriction of a word length of the D/A converter 19, it is preferable to limit the variable gain circuits 16A and 16B to the use for setting a level difference between the code channels. Accordingly, a control process shown in FIG. 2 is performed. In this figure, variables A, B and C are gains in a dB unit of the variable gain circuits 16A, 16B and 22, respectively. Also, the meaning of each condition is as follows:

① TPCA=UP: Increase transmission power of a code channel A by 1 dB

② TPCA=DOWN: Decrease transmission power of a code channel A by 1 dB

③ TPCB=UP: Increase transmission power of a code channel B by 1 dB

④ TPCB=DOWN: Decrease transmission power of a code channel B by 1 dB

First, at STEP 51, the meaning of the TPCA signal and the TPCB signal is analyzed, and the process branches off in accordance with the condition.

In case of TPCA=UP and TPCB=UP, at STEP 52, a control signal C is output so as to increase a gain C of the variable gain circuit 22 by 1 dB, and the process ends. Similarly, in case of TPCA=DOWN and TPCB=DOWN, at STEP 53, the control signal C is output so as to decrease the gain C of the variable gain circuit 22 by 1 dB, and the process ends. Ultimately, when both the TPCA signal and TPCB signal are UP or DOWN, the transmission power control is conducted by using only the variable gain circuit 22 in the high frequency analog circuit section.

On the other hand, in case that one of the TPCA signal and the TPCB signal is UP and the other is DOWN, if the variable gain circuits 16A and 16B are within a control range, the control is conducted by using them, and if the variable gain circuits 16A and 16B are out of the control range, the control is conducted together with the variable gain circuit 22. In other words, in case of TPCA=UP and TPCB=DOWN, first, it is determined whether a gain A of the variable gain circuit 16A is a maximum value (MAX) (STEP 54), and if it is the maximum value, the process directly moves to STEP 56, and if it is not the maximum value, after the gain A is increased by 1 dB at STEP 55, the process moves to STEP 56. At STEP 56, it is determined whether a gain B of the variable gain circuit 16B is a minimum value (MIN), and if it is not the minimum value, after the gain B is decreased by 1 dB at STEP 57, the process ends, and if it is the minimum value, after the gain C of the variable gain circuit 22 is decreased by 1 dB at STEP 58, the process ends.

Similarly, in case of TPCA=DOWN and TPCB=UP, first, it is determined whether the gain B of the variable gain circuit 16B is a maximum value (MAX) (STEP 59), and if it is the maximum value, the process directly moves to STEP 61, and if it is not the maximum value, after the gain B is increased by 1 dB at STEP 60, the process moves to STEP 61. At STEP 61, it is determined whether the gain A of the variable gain circuit 16A is a minimum value (MIN), and if it is not the minimum value, after the gain A is decreased by 1 dB at STEP 62, the process ends, and if it is the minimum value, after the gain C of the variable gain circuit 22 is decreased by 1 dB at STEP 63, the process ends.

In accordance with a mode of the design of the mobile communication system by means of the CDMA, with respect to the transmission power of the code channel, the power control signals (the TPCA signal and the TPCB signal) for each code channel instruct not only to increase it by 1 dB (UP) and decrease it by 1 dB (DOWN), for example, but also not to change the transmission power (NOP). In this case, one of the power control signals (the TPCA signal and the TPCB signal) for every code channel is not for changing a transmission level. Even in such a case, basically, the variable gain circuits 16A and 16B deal with the control, and if the variable gain circuits 16A and 16B cannot deal with the control due to a relation of the control range, the control is conducted together with the variable gain circuit 22.

Figure 3:
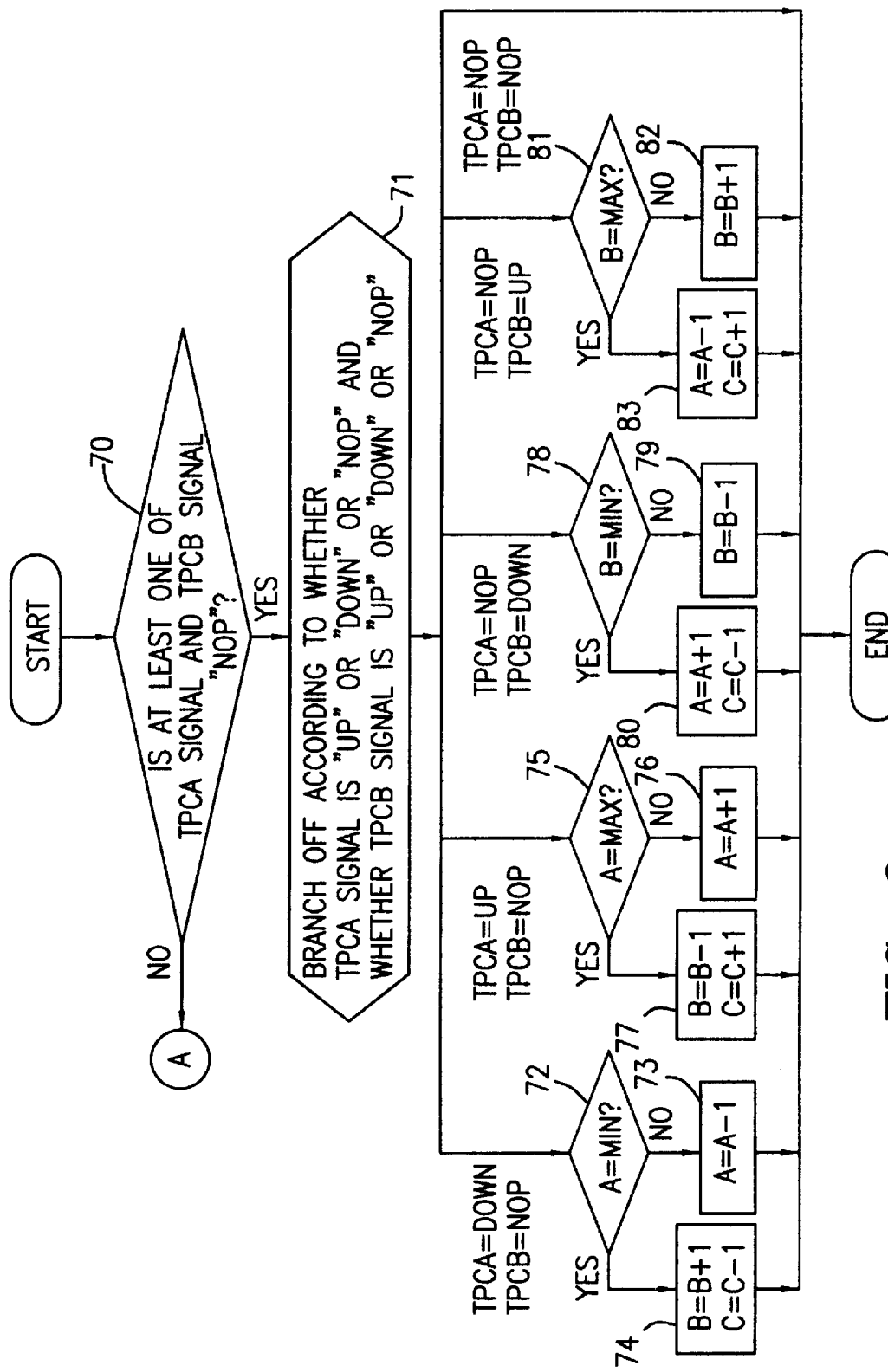
FIG. 3 is a flowchart showing one example of processing procedure of transmission power control.

FIG. 3 is a flowchart showing a control process in case that power control signals provide three instructions such as increase of transmission power (UP), decrease of the transmission power (DOWN) and no change of the transmission power (NOP).

First, it is determined whether at least one of the TPCA signal and the TPCB signal is NOP (STEP 70), and if both signals are not NOP, processing same as the above-mentioned processing shown in FIG. 2 is conducted (as illustrated as A). If at least one is NOP, the meaning of the TPCA signal and the TPCB signal is then analyzed, and the process branches off in accordance with the condition (STEP 71).

As a result of the branching off of the process in accordance with the condition, in case of TPCA=DOWN and TPCB=NOP, at STEP 72, it is determined whether the gain A of the variable gain circuit A is a minimum value, and if it is not the minimum value, after the gain A is decreased by 1 dB at STEP 73, the process ends, and if it is the minimum value, since the gain A is not decreased more than this, at STEP 74, the gain B of the variable gain circuit B is increased by 1 dB and the gain C of the variable gain circuit C is decreased by 1 dB, and as a whole, the gain of the code channel A is decreased by 1 dB and the gain of the code channel B remains as it is. Similarly, in case of TPCA=UP and TPCB=NOP, at STEP 75, it is determined whether the gain A is a maximum value, and if it is not the maximum value, after the gain A is increased by 1 dB at STEP 76, the process ends, and if it is the maximum value, at STEP 77, the gain B is decreased by 1 dB and the gain C is increased by 1 dB. In case of TPCA=NOP and TPCB=DOWN, at STEP 78, it is determined whether the gain B is a minimum value, and if it is not the minimum value, after the gain B is decreased by 1 dB at STEP 79, the process ends, and if it is the minimum value, at STEP 80, the gain A is increased by 1 dB and the gain C is decreased by 1 dB. Also, in case of TPCA=NOP and TPCB=UP, at STEP 81, it is determined whether the gain B is a maximum value, and if it is not the maximum value, after the gain B is increased by 1 dB at STEP 82, the process ends, and if it is the maximum value, at STEP 83, the gain A is decreased by 1 dB and the gain C is increased by 1 dB. In case of TPCA=NOP and TPCB=NOP, the process ends as it is without doing anything.

In addition, the process of the transmission power adjustment in the mobile terminal 1 is not necessarily limited to that shown in FIG. 2 (or FIG. 3). It is possible to adjust a total average transmission level of the code channels A and B by the variable gain circuit 22 and to adjust a level difference between the code channels A and B by the variable gain circuits 16A and 16B.

Different from the conventional mobile terminal shown in FIG. 9, in the mobile terminal of the first embodiment as explained above, since the number of the D/A converter, the modulator, and the variable gain circuit disposed in the high frequency analog circuit section is one, respectively, the increase of a circuit scale and electric power consumption can be suppressed. Also, the individual variable gain circuits 16A and 16B for each code channel are provided within the digital signal processing circuit section 5, and thereby, it is possible to set a level difference between the code channels during the multi-code transmission.

The second embodiment

Figure 4:
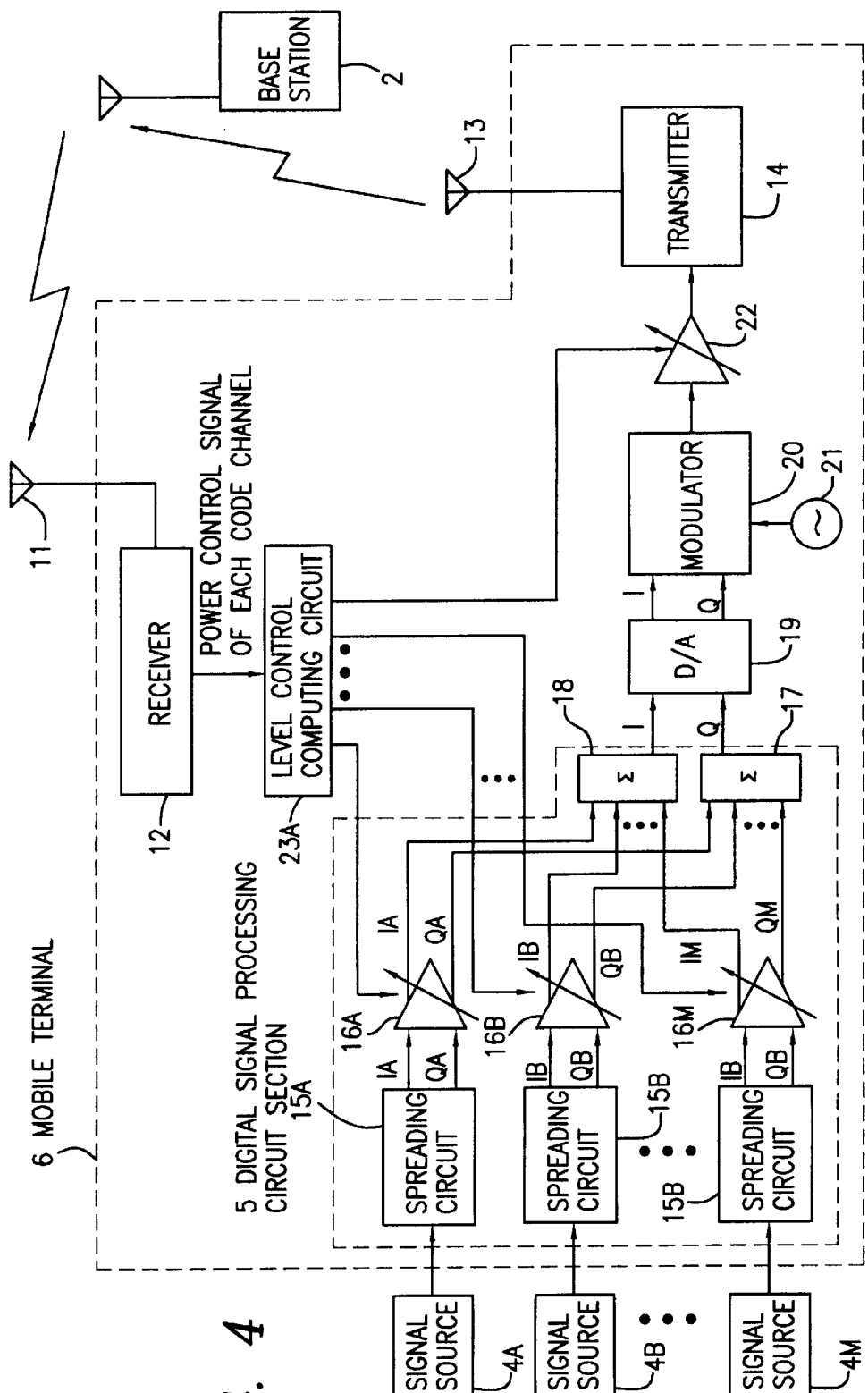
FIG. 4 is a block diagram showing an arrangement of a mobile terminal of the second embodiment of the present invention.

Although the number N of the code channels is two in the above-mentioned first embodiment, FIG. 4 shows an arrangement of a mobile terminal 6 in case that the number of the code channels is M (M≧3). This mobile terminal is connected to M signal sources 4A–4M, and M series of arrangements, each of which is from a spreading circuit to a variable gain circuit on a digital side, are provided in a digital signal processing circuit section 5. In other words, the digital signal processing circuit section 5 includes M spreading circuits 15A–15M and M variable gain circuits 16A–16M, and in-phase signals IA–IM from each of the variable gain circuits 16A–16M are added to each other in an adder 17 and an in-phase signal I is generated, and similarly, orthogonal signals QA–QM from each of the variable gain circuits 16A–16M are added to each other in an adder 18 and an in-phase signal Q is generated. A level control calculating circuit 23A conducts control of the variable gain circuits 16A–16M and 22. An arrangement on an output side of the adders 17 and 18 is the same as that in the case of the first embodiment.

In this mobile terminal 6, the level control calculating circuit 23A determines a level adjustment in quantity in the variable gain circuits 16A–16M and 22 based on a TPC signal for each code channel transmitted from the base station 2. Particularly, for example, an average transmission signal level of each code channel can be adjusted by the variable gain circuit 22, and a level difference between the code channels can be adjusted by the variable gain circuits 16A–16M.

Even though the number of the code channels which are used by the mobile terminal is equal to or more than three, it can be understood that if an arrangement within the digital signal processing circuit section 5 in the mobile terminal of the first embodiment is modified, the arrangement is applicable. Therefore, even though the number of the code channels that are used increases, it is possible to suppress the increase of a circuit scale and electric power consumption.

The third embodiment

In case of using a plurality of code channels in a single mobile terminal, reception levels necessary for every code channel on a side of the base station are determined by an error correcting method, a spreading ratio G and a required standard of an error rate (which is about $10^{-3}$ for voice communication and about $10^{-6}$ for data communication, for example) in the respective code channels. However, a difference between these reception levels is considered to be almost constant. Therefore, if considering that these code channels are transmitted from the same mobile terminal, although transmission power itself has to be controlled within a fairly wide range, it is considered that a difference of required transmission power between the code channels is specifically determined in accordance with a difference of transmission methods and so forth.

Figure 5:
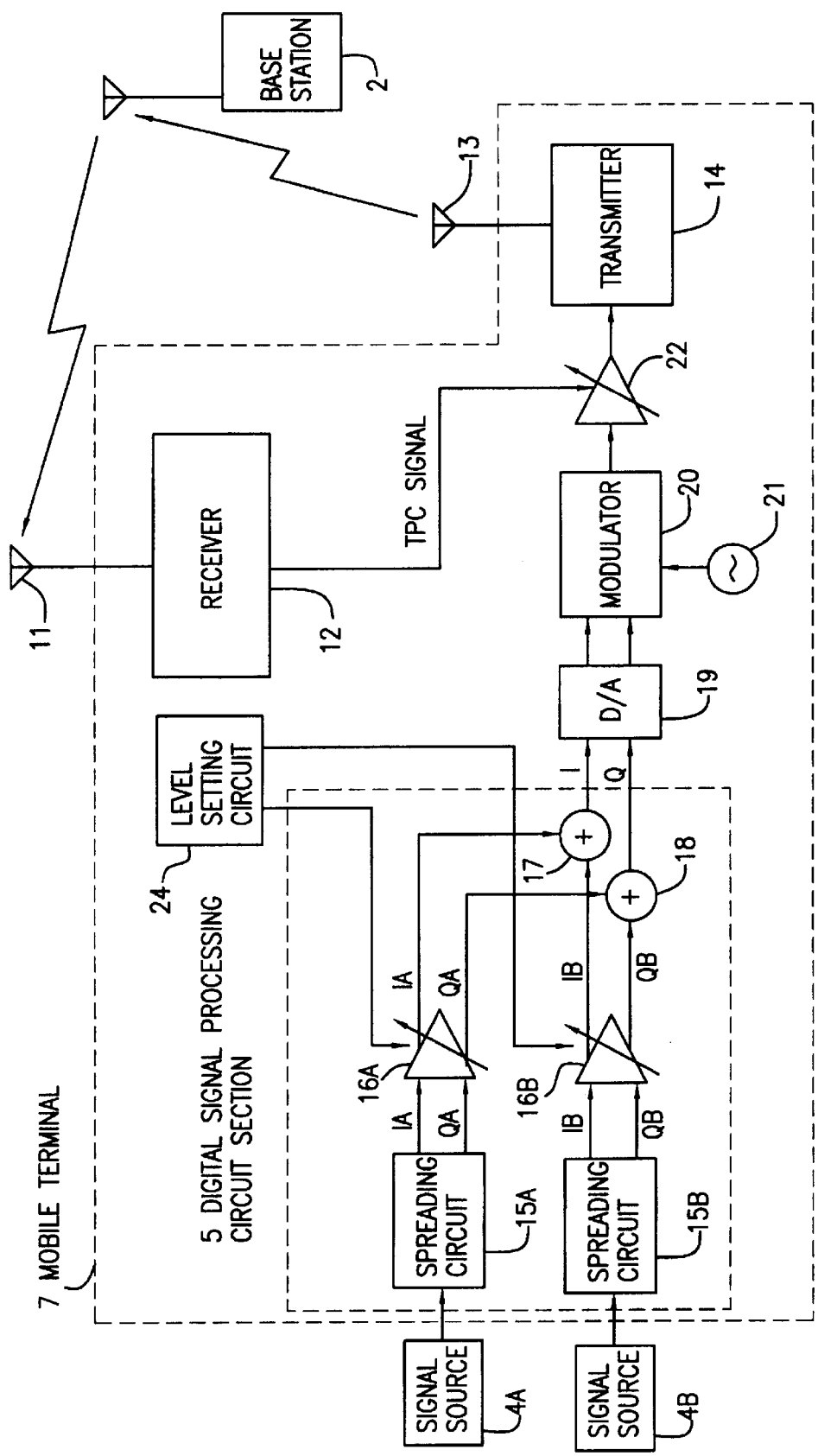
FIG. 5 is a block diagram showing an arrangement of a mobile terminal of the third embodiment of the present invention.

Accordingly, if the kind of the signal sources 4A and 4B are understood in the mobile terminal of the first embodiment, it is considered that a required transmission level difference between the code channels is specifically determined. A mobile terminal 7 shown in FIG. 5 is constructed so that a level setting circuit 24 is provided for discriminating the kind of signals of the signal sources 4A and 4B, calculating a level difference between the code channels A and B and conducting the setting of the variable gain circuits 16A and 16B, instead of providing the level control calculating circuit 23 in the mobile terminal 1 shown in FIG. 1. If a relative level difference is set in the variable gain circuits 16A and 16B by the level setting circuit 24 that is uniquely included in the mobile terminal 7, power control can be realized by controlling the variable gain circuit 22 using a power control signal (one of a TPCA signal and a TPCB signal, simply referred to as a TPC signal, hereinafter) from the base station 2.

Also, if an arrangement is adopted, in which a relative level between the code channels is previously calculated based on a bit rate, an error correcting method, a spreading ratio, a required error rate and so forth, and the calculated level is stored in a ROM (Read Only Memory) and is read from the level setting circuit 24, it is not necessary to conduct a calculation, and it is possible to simplify a circuit more and to reduce electric power consumption.

The fourth embodiment

In each of the above-described embodiments, if the number of the code channels is M, M+1 variable gain circuits in all, which are consisted of M variable gain circuits, and one variable gain circuit on an output side of a modulator, are provided within the digital signal processing circuit 5. However, since the number of the code channels, which is an object to be controlled, is M, originally, it should be appropriate to provide M variable gain circuits in all. If considering that an enough dynamic range cannot be provided in the variable gain circuits disposed within the digital signal processing circuit section, the variable gain circuit within the high frequency circuit section is essential. Accordingly, an arrangement can be considered, in which the variable gain circuit for specific one code channel is omitted in the digital signal processing circuit section.

Figure 6:
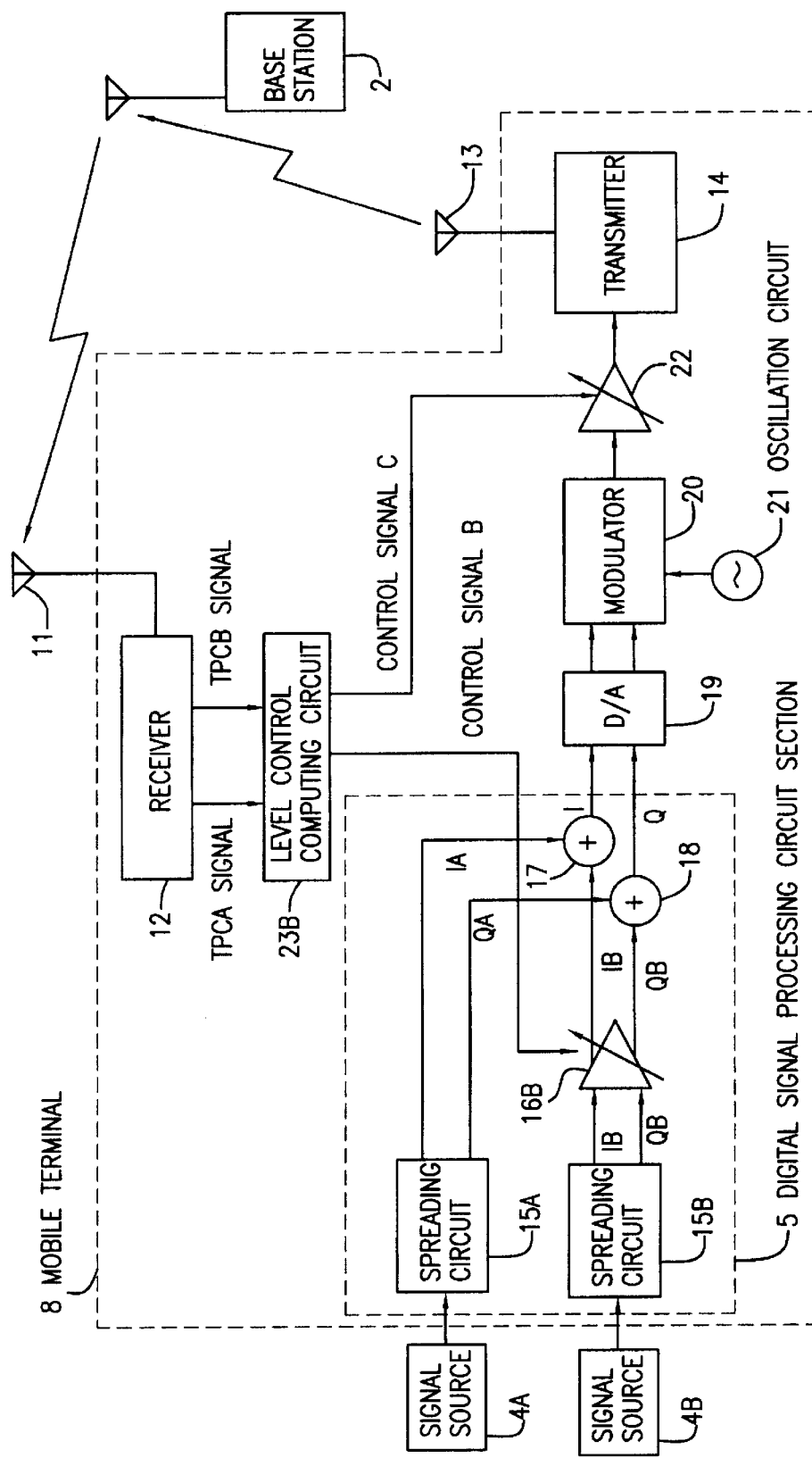
FIG. 6 is a block diagram showing an arrangement of a mobile terminal of the fourth embodiment of the present invention.
Figure 7:
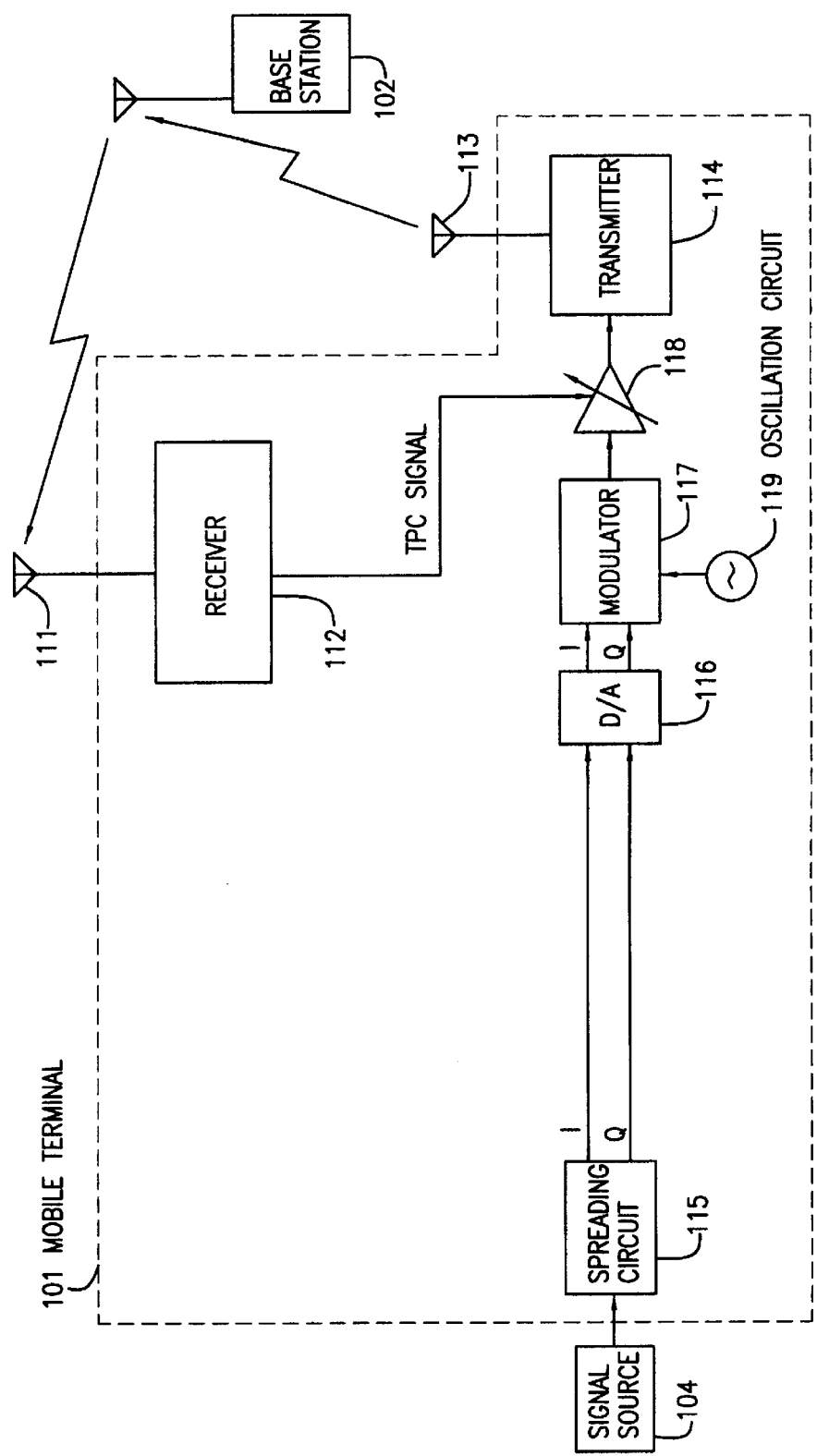
FIG. 7 is a block diagram showing an arrangement of a conventional mobile terminal using CDMA.

FIG. 6 is a block diagram showing an arrangement in case of M=2, in which a variable gain circuit for specific one code channel is removed. This mobile terminal 8 is constructed so that the variable gain circuit 16A on a side of the code channel A in the mobile terminal 1 shown in FIG. 1 is removed, and base band signals of an in-phase component and an orthogonal component from the spreading circuit 15A are directly input to the adders 17 and 18, respectively. Also, the level control calculating circuit 23 controls the variable gain circuits 16B and 22 based on a TPCA signal and a TPCB signal.

In the case of this mobile terminal 8, since the number of the code channels coincides with the total number of the variable gain circuits, when a level adjustment value for every code channel is given, a level adjustment in quantity at each variable gain circuit is specifically determined. In case of adjusting a level of only the code channel A, for example, the level can be adjusted by an amount corresponding to the adjustment in quantity by means of the variable gain circuit 22, and the level can be adjusted by an amount corresponding to that in which a sign of the adjustment in quantity is reversed, by means of the variable gain circuit 16B of the code channel B. In case of adjusting a level of only the code channel B, the level can be adjusted based on the adjustment in quantity by the variable gain circuit 16B. Further, in case of adjusting levels of both the code channels, the levels can be adjusted by an adjustment in quantity, which is generated by combining the adjustment in quantity in the case of adjusting only the code channel A and the adjustment in quantity in the case of adjusting only the code channel B, by means of each of the variable gain circuits 16B and 22.

The preferable embodiments of the present invention were explained above. However, the present invention is not limited to the above-mentioned embodiments.

In the above-mentioned embodiments, the transmission power control at the mobile terminal in the mobile communication system was explained. However, the present invention is applicable to a CDMA system other than the mobile communication system, and for example, to a system in which a terminal is assumed not to move. As such a system, there is a wireless local loop system and so forth, which is used, instead of a wire telecommunication network, in constructing a telecommunication network in an area having small population density and in developing countries. Also, with regard to the kind of the spread spectrum system, it is not limited to the Direct Sequence (DS), and frequency hopping (FH) and chirp spreading, for example, can be used. Furthermore, with regard to the modulation method in the modulator, it is not limited to orthogonal modulation by means of QPSK, and a modulation method such as $\pi/4$ shift QPSK, DPSK (differential phase shift keying), and BPSK (binary phase shift keying) can be adopted.

As explained above, the present invention effects an advantage that even in case of using a plurality of code channels and conducting the transmission power control for every code channel, since only one variable gain circuit for adjusting a level difference between the code channels is needed, which is to be disposed in a high frequency circuit part, it is possible to suppress the increase of a circuit scale and electric power consumption.

The entire disclosure of Japanese Patent Application No. 10-68589 filed on Mar. 18, 1998 including specification, claims, drawing and summary are incorporated herein by reference in its entirety.

What is claimed is:

1. A method of adjusting transmission power in a CDMA terminal for code division multiple access communication in a spread spectrum system and transmitting information using a plurality of code channels, said method comprising the steps of:

generating base band signals and spreading data over a plurality of code channels, said data comprising in-phase components and orthogonal components of said base band signals;

adjusting the levels of said in-phase components and said orthogonal components for each of the plurality of code channels;

adding said in-phase components and said orthogonal components over said plurality of code channels;

modulating the signals after addition to generate a high frequency signal;

adjusting a level of said high frequency signal; and sending said adjusted high frequency signal.

2. A method of adjusting transmission power in a CDMA terminal according to claim 1, wherein an adjustment in quantity of levels of said in-phase components and said orthogonal components and an adjustment in quantity of a level of said high frequency signal are determined based on a control signal from an other station.

3. A method of adjusting transmission power in a CDMA terminal according to claim 2, wherein levels of said in-phase components and said orthogonal components are not changed and only a level of said high frequency signal is changed when said control signal is for increasing or decreasing the levels by a constant quantity common to each of said code channels.

4. A method of adjusting transmission power in a CDMA terminal according to claim 1, wherein said step of adjusting the level of aid high frequency signal comprises adjusting a total average level of transmission signals of said code channels and adjusting the levels of said in-phase components and said orthogonal components for every code channel comprises adjusting a different of levels between said code channels.

5. A method of adjusting transmission power in a CDMA terminal according to claim 1, further comprising a step of determining a level difference between said in-phase components and said orthogonal components and the code channels in accordance with characteristic of data to be transmitted to each code channel, wherein the level for each code channel is adjusted in accordance with said determined level difference.

6. A method of adjusting transmission power in a CDMA terminal according to claim 1, wherein an adjustment of levels said in-phase components and said orthogonal components is not conducted for one specific code channel.

7. A method of adjusting transmission power in a CDMA terminal according to claim 1, wherein said CDMA terminal is a mobile station in a mobile communication system, and said other station is a base station.

8. A method of adjusting transmission power in a CDMA terminal according to claim 1, wherein said spread spectrum system is a direct sequence system.

9. An apparatus for adjusting transmission power in a CDMA terminal for code division multiple access communication in a spread spectrum system transmitting information using a plurality of code channels, comprising:

a plurality of spreading means for each code channel for spreading data;

a plurality of first variable gain control means disposed for said each code channel for adjusting levels of output signals from said spreading means;

an adder for adding outputs from each of said first variable gain control means;

a modulator for modulating an output from said adder, and outputting a high frequency signal; and second variable gain control means for adjusting a level of said high frequency signal.

10. The apparatus for adjusting transmission power in a CDMA terminal according to claim 9, further comprising a transmitter for sending an output signal from said second variable gain control means to an other station.

11. The apparatus for adjusting transmission power in a CDMA terminal according to claim 9, further comprising control means for determining a level adjustment in each of said first variable gain control means and said second variable gain control means based on a control signal from an other station.

12. The apparatus for adjusting transmission power in a CDMA terminal according to claim 11, wherein a total average level of transmission signals of said code channels is adjusted by said second variable gain control means, and a difference of levels between the code channels is adjusted by said first variable gain control means.

13. The apparatus for adjusting transmission power in a CDMA terminal according to claim 9, further comprising;

a level setting circuit for setting a level adjustment in quantity in each of said first variable gain control means based on a required level difference between said code channels and control means for determining a level adjustment in quantity in said second variable gain control means based on a control signal from an other station.

14. The apparatus for adjusting transmission power in a CDMA terminal according to claim 13, wherein said required level difference is determined using insert of a transmission data in said each code channel.

15. The apparatus for adjusting transmission power in a CDMA terminal according to claim 9, wherein said first variable gain control means is not disposed in one specific code channel.

16. The apparatus for adjusting transmission power in a CDMA terminal according to claim 9, wherein each of said spreading circuits and each of said first variable gain control means are disposed in a digital signal processing circuit section, and said second variable gain control means is constructed as a high frequency analog circuit.

17. The apparatus for adjusting transmission power in a CDMA terminal according to claim 9, wherein said CDMA terminal is a mobile station in a mobile communication system, and an other station is a base station in said mobile communication system.

18. The apparatus for adjusting transmission power in a CDMA terminal according to claim 9, wherein said spread spectrum system is direct sequence system.

19. An apparatus for adjusting transmission power in a mobile station for code division multiple access communication with direct sequence system of spread spectrum system and transmitting information using a plurality of code channels, comprising:

a plurality of spreading means disposed for each code channel, said spreading means for spreading data;

a plurality of first variable gain control means disposed for said each code channel, said first variable gain control means for adjusting levels of output signals from said spreading means;

adder for adding outputs from each of said first variable gain control means;

modulator for modulating based on an output from said adder, and outputting a high frequency signal;

second variable gain control means for adjusting a level of said high frequency signal;

transmitter for sending an output signal from said second variable gain control means to the base station the other station; and control means for determining a level adjustment in quantity in each of said first variable gain control means and said second variable gain control means based on a control signal from said other station.

20. The apparatus for adjusting transmission power in a CDMA terminal according to claim 19, wherein a total average level of transmission signals of said code channels is adjusted by said second variable gain control means, and a difference of levels between the code channels is adjusted by said first variable gain control means.

21. The apparatus for adjusting transmission power in a CDMA terminal according to claim 19, further comprising;

a level setting circuit for setting a level adjustment in each of said first variable gain control means based on a required level difference between said code channels and control means for determining a level adjustment in said second variable gain control means based on a control signal from said other station.

22. The apparatus for adjusting transmission power in a CDMA terminal according to claim 19, wherein said required level difference is determined using information with respect to characteristic of a transmission data in each of code channels.

23. The apparatus for adjusting transmission power in a CDMA terminal according to claim 19, wherein said first variable gain control means is not disposed in one specific code channel.

24. The apparatus for adjusting transmission power in a CDMA terminal according to claim 19, wherein each of said spreading circuits and each of said first variable gain control means are disposed in a digital signal processing circuit section, and said second variable gain control means is a high frequency analog circuit.

25. A method of adjusting transmission power in a CDMA terminal according to claim 2, wherein an adjustment of levels said base band signals is not conducted for one specific code channel.

26. A method of adjusting transmission power in a CDMA terminal for code division multiple access communication in a spread spectrum system transmitting information using a plurality of code channels, said method comprising:

generating base band signals by spreading data over every code channel;

adjusting the level differences of said base band signals between code channels;

adding said adjusted base band signals over said plurality of code channels;

modulating said signal after addition to generate a high frequency signal;

adjusting a total average level of said code channels and adjusting the levels of said high frequency signal; and sending said adjusted high frequency signal to an other station.

27. A method of adjusting transmission power in a CDMA terminal according to claim 26, wherein an adjustment of said base band signal level for every code channel and an adjustment of said high frequency signal level are determined based on a control signal from said other station.

28. A method of adjusting transmission power in a CDMA terminal according to claim 27, wherein levels of said base band signals are not changed and only a level of said high frequency signal is changed when said control signal is for increasing or decreasing the levels by a constant common to each of said code channels.

29. A method of adjusting transmission power in a CDMA terminal according to claim 26, further comprising a step of determining a level difference of said band signals between the code channels in accordance with characteristic of data to be transmitted to each code channel, wherein a level for each code channel is adjusted in accordance with said determined level difference.

30. A method of adjusting transmission power in a CDMA terminal according to claim 26, wherein an adjustment of level said base band signals is not conducted for one specific code channel.

31. A method of adjusting transmission power in a CDMA terminal according to claim 26, wherein said CDMA terminal is a mobile station in a mobile communication system and said other station is a base station in said mobile communication system.

32. An apparatus of adjusting transmission power in a CDMA terminal for code division multiple access communication with spread spectrum system transmitting information using a plurality of code channels, comprising:

a plurality of spreading means for spreading data disposed for each code channel;

a plurality of first variable control means disposed for said each code channel, for adjusting output signal levels from said spreading means;

adders for adding outputs from each of said first variable gain control means;

modulator for modulating an output from said adder and outputting a high frequency signals;

second variable gain control means for adjusting a level of said high frequency signal; and a control means for controlling said first variable gain control means and said second variable gain control means.

33. An apparatus for adjusting transmission power in a CDMA terminal according to claim 32, further comprising a transmitter for sending an output signal from said second variable gain control means.

34. An apparatus for adjusting transmission power in a CDMA terminal according to claim 33, further comprising control means for determining a level adjustment each of said first variable gain control means and said second variable gain control means based on a control signal from an other station.

35. An apparatus for adjusting transmission power in a CDMA terminal according to claim 32, further comprising;

level setting circuit for setting a level adjustment in each of said first variable gain control means based on a required level difference between said code channels and control means for determining a level adjustment in said second variable gain control means based on a control signal from an other station.

36. An apparatus for adjusting transmission power in a CDMA terminal according to claim 35, comprising means for determining said required level difference based on transmission data in said each code channel.

37. An apparatus for adjusting transmission power in a CDMA terminal according to claim 32, wherein said first variable gain control means is omitted in one code channel.

38. An apparatus for adjusting transmission power in a CDMA terminal according to claim 32, wherein each of said spreading circuits and each of said first variable gain control means are disposed in a digital signal processing circuit section, and said second variable gain control means is constructed as a high frequency analog circuit.

39. An apparatus for adjusting transmission power in a CDMA terminal according to claim 32, wherein said CDMA terminal is a mobile station in a mobile communication system, and an other station is a base station in said mobile communication system.

40. An apparatus for adjusting transmission power in a CDMA terminal according to claim 32, wherein said spread spectrum system is direct sequence system.

* * * * *